United States Patent
Abe

[19]

[11] Patent Number: 6,058,273
[45] Date of Patent: May 2, 2000

[54] REAL-IMAGE TYPE VIEWFINDER

[75] Inventor: Tetsuya Abe, Hokkaido, Japan

[73] Assignee: Asahi Kogaku Kogyo Kabushiki Kaisha, Tokyo, Japan

[21] Appl. No.: 09/034,462

[22] Filed: Mar. 4, 1998

[30] Foreign Application Priority Data

Mar. 5, 1997 [JP] Japan ..... 9-067234

[51] Int. Cl.⁷ ..... G03B 13/02
[52] U.S. Cl. ..... 396/384; 396/271; 396/296; 396/373
[58] Field of Search ..... 396/373, 292, 396/296, 384, 386, 271

[56] References Cited

U.S. PATENT DOCUMENTS

| | | | |
|---|---|---|---|
| 4,016,576 | 4/1977 | Nomura | 396/292 |
| 4,231,649 | 11/1980 | Kimura et al. | 396/384 |
| 5,218,396 | 6/1993 | Morisawa . | |
| 5,223,874 | 6/1993 | Kirigaya | 396/386 |
| 5,581,318 | 12/1996 | Shiratori | 396/296 |
| 5,604,554 | 2/1997 | Kirigaya . | |

FOREIGN PATENT DOCUMENTS

| | | |
|---|---|---|
| 1113736 | 5/1989 | Japan . |
| 2546330 | 10/1989 | Japan . |

*Primary Examiner*—Russell Adams
*Attorney, Agent, or Firm*—Greenblum & Bernstein, P.L.C.

[57] ABSTRACT

A real-image type viewfinder comprises a viewfinder optical system including a positive objective lens system for obtaining an inverted finder-image, an erecting optical system for converting the inverted finder-image into an erected finder-image, and an ocular lens system for viewing the erected finder-image through the erecting optical system. A half mirror is provided at a suitable location along a viewfinder optical axis, defined by the viewfinder optical system. A photometry optical system is provided along an extension of an incident optical axis, defined by a principal ray of light rays being incident on the half mirror along an optical axis of the objective lens system. An optical information-pattern-forming system is provided along an extension of a reflective optical axis, defined by a principal ray of light rays reflected by the half mirror toward the ocular lens system.

16 Claims, 6 Drawing Sheets

REAL-IMAGE TYPE VIEWFINDER

BACKGROUND OF THE INVENTION

1. Field of the Invention

This invention relates to a real-image type viewfinder, used in a photographing camera, a video camera and so on, and, in particular, to a real-image type viewfinder for a camera, such as a lens-shutter type camera, which has a viewfinder optical system independent of a photographing optical system.

2. Description of the Related Art

In general, a viewfinder optical system for a real-image type viewfinder includes: a positive objective lens system; an erecting optical system for converting an inverted finder-image, obtained from the positive objective lens system, into an erected finder-image; and an ocular lens system for viewing the erected finder-image therethrough.

As is well known, it is necessary to display various information patterns, such as a viewing-field-frame for defining a frame area to be photographed, a photometry-sensing-frame for defining a photometric area to be measured, suitable information symbols and so on, on a viewing field of the viewfinder. Namely, the various information patterns must be superimposed on the finder-image, viewed through the ocular optical system of the viewfinder optical system.

Conventionally, in order to superimpose the information patterns on the finder image, a transparent glass plate, on which the information-patterns are printed as opaque areas, is placed in the vicinity of an image plane of the positive objective lens system of the viewfinder optical system. Thus, when viewing through the ocular optical system, the finder-image, on which the information patterns are superimposed, can be observed, due to the transparent glass plate with the information patterns being located at the image plane.

The locating of the transparent glass plate in the viewfinder optical system is relatively easy and inexpensive. Nevertheless, the method utilized is unadvisable, as dust, dirt and other types of particulate matter may be easily deposited on the transparent glass plate. Of course, the adhesion of dust and dirt to the transparent glass plate impairs the visual clarity due to the transparent glass plate being positioned on the image plane.

Unexamined Japanese Patent Publication No. 1-113736 discloses another approach for superimposing the information patterns on the finder-image. According to this approach, an optical information-pattern-forming system is incorporated into the viewfinder optical system, and includes a half mirror interposed between the erecting optical system and the ocular optical system, and a translucent plate, such as a frosted glass plate, having the information patterns printed as transparent-area segments thereon.

The translucent plate is positioned at a location that is the optical equivalent of the location of the image plane of the positive objective optical system. The translucent plate is illuminated with natural or external light, in such a manner that light rays, passing through the translucent plate, are directed to the ocular optical system through the half mirror. Thus, when viewing through the ocular optical system, the finder-image, obtained through the objective optical system, can be observed together with the information patterns superimposed thereon, which are obtained through the translucent plate.

As mentioned above, the information patterns are printed as transparent-area segments on the translucent plate. Therefore, providing particulate matter is only adhered to the translucent area of the translucent plate, the visual clarity of the ocular optical system is not impaired.

Nevertheless, the approach, disclosed in the above-mentioned publication, has some disadvantages as follows:

Firstly, an additional window, for introducing natural or external light into the optical information-pattern-forming system to illuminate the translucent plate, must be provided in a camera body, and thus a freedom of design of the camera body is restricted, due to the provision of the additional window.

Secondly, a focal length of the ocular optical system is increased, due to the existence of the half mirror interposed between the erecting optical system and the ocular optical system, resulting in a bulkiness of the viewfinder optical system.

Thirdly, when the concept of the previously-mentioned publication is applied to an existing camera, a basic design for a viewfinder optical system of the existing camera must be modified, due to the fact that the half mirror must be interposed between the erecting optical system and the ocular optical system. Of course, a modification to the basic design of the viewfinder optical system is very costly.

SUMMARY OF THE INVENTION

Therefore, an object of the present invention is to provide a real-image type viewfinder, used in a photographing camera, a video camera and so on, which is constituted such that at least one of the above-mentioned disadvantages can be surmounted.

In accordance with the present invention, there is provided a real-image type viewfinder comprising a viewfinder optical system which includes: a positive objective optical system for obtaining an inverted finder-image; an erecting optical system for converting the inverted finder-image into an erected finder-image; an ocular optical system for viewing the erected finder-image through the erecting optical system; a half mirror element provided at a suitable location along a viewfinder optical axis defined by the viewfinder optical system; an optical photometry system provided along an extension of an incident optical axis, defined by a principal ray of light rays being incident on the half mirror element along an optical axis of the positive objective optical system; and an optical information-pattern-forming system provided along an extension of a reflective optical axis, defined by a principal ray of light rays reflected by the half mirror element toward the ocular optical system.

The erecting optical system may include an optical prism assembly, and the half mirror element may be formed with a surface of the optical prism assembly. The optical prism assembly may comprise a pentagonal prism associated with a roof mirror. Also, the optical prism system may comprises at least two right-angled triangular prisms associated with a reflective mirror.

The optical information-pattern-forming system may comprise a liquid crystal display panel in which information patterns are defined as light-transmitting-area segments produced therein. Optionally, the optical information-pattern-forming system comprises a mask element in which information patterns are defined as light-transmitting-area segments formed therein.

The viewfinder optical system may further include a mask element positioned in the vicinity of an image-forming plane defined by the positive objective optical system, and a viewing-field-frame of the information patterns is defined as an open area formed in the mask element.

The optical information-pattern-forming system may be arranged so as to be illuminated with natural or external light at either a front side of a camera body or a top side of the camera body.

BRIEF DESCRIPTION OF THE DRAWINGS

The objects and other objects of the present invention will be better understood from the following description, with reference to the accompanying drawings, in which.

DESCRIPTION OF THE PREFERRED EMBODIMENTS

Figure 1:
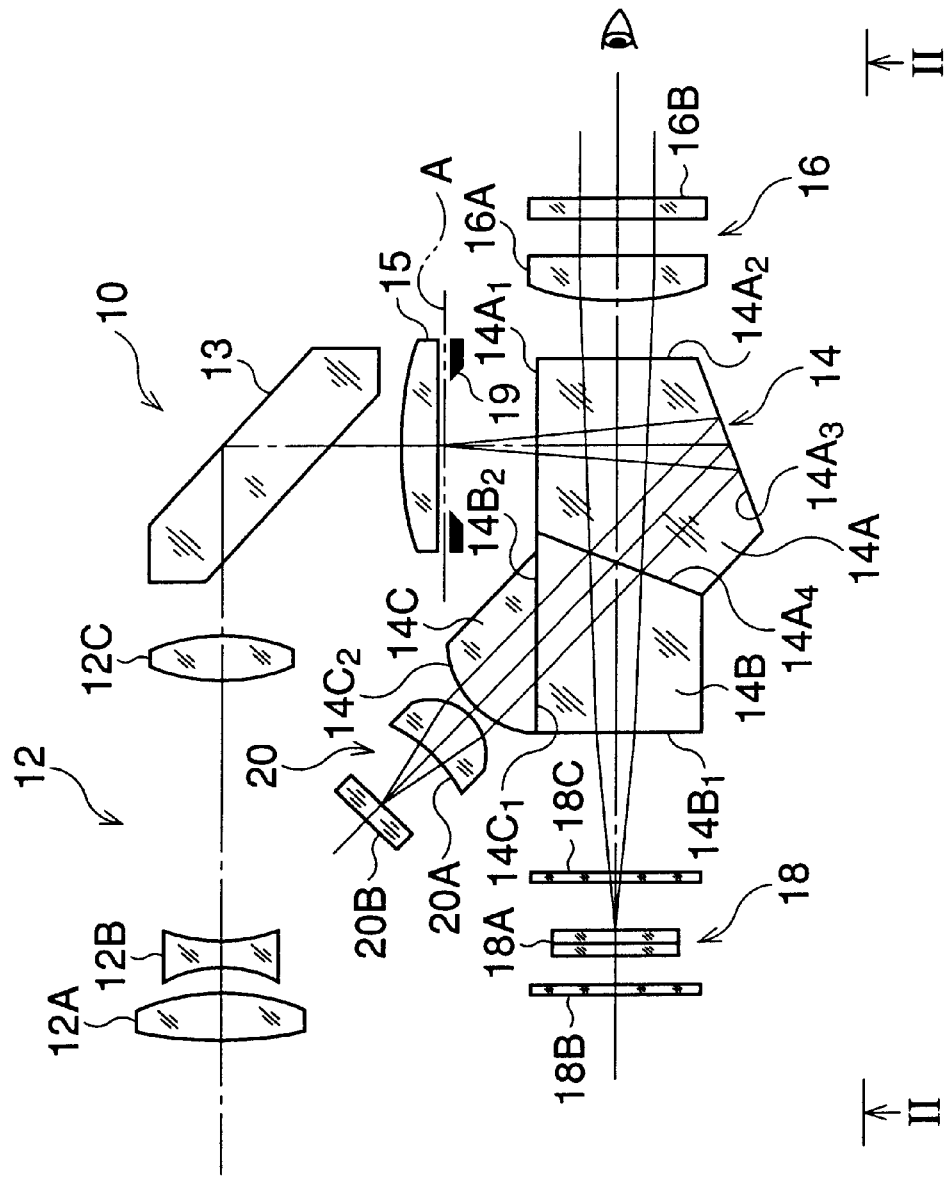
FIG. 1 is a plan view showing an arrangement of a viewfinder optical system of a first embodiment of a real-image type viewfinder according to the present invention.
Figure 2:
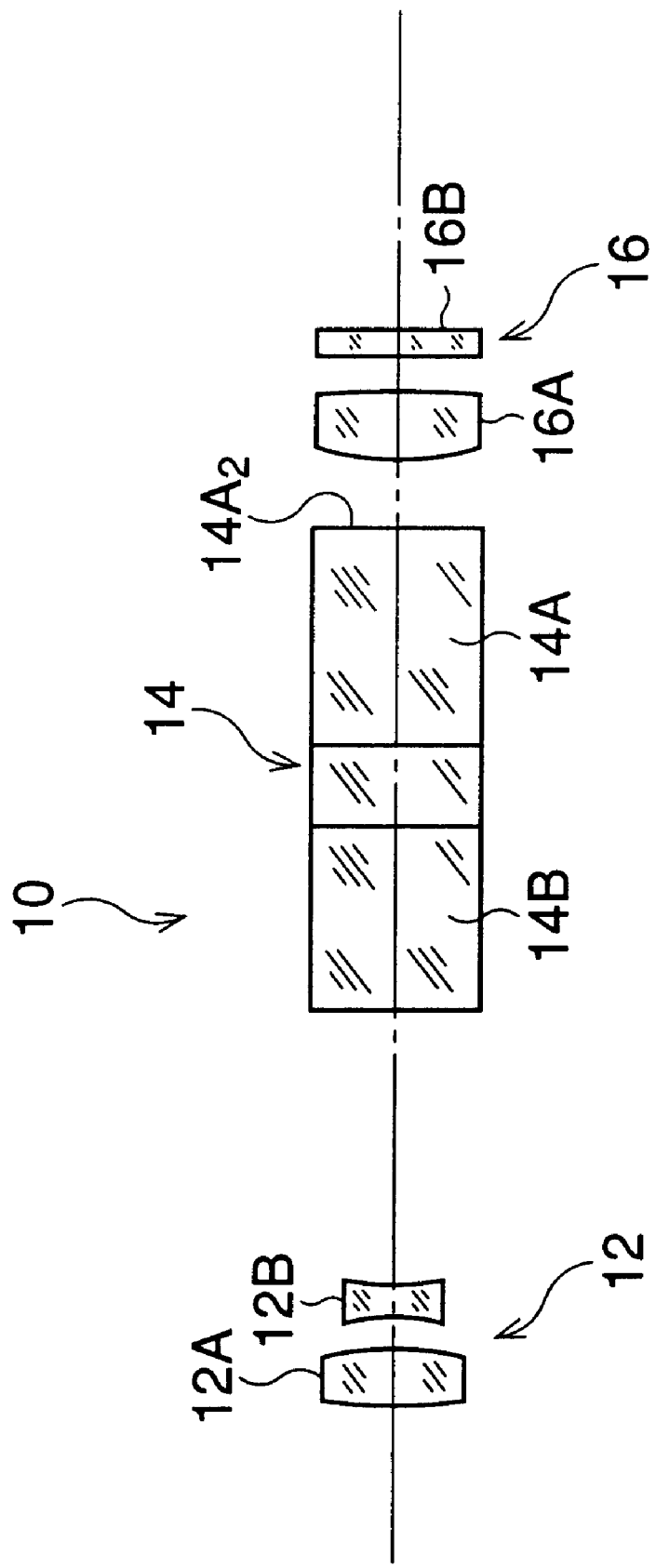
FIG. 2 is a side view of FIG. 1, observed from line II—II of FIG. 1.

FIGS. 1 and 2 show a first embodiment of a real-image type viewfinder according to the present invention. The real-image type viewfinder comprises a viewfinder optical system, generally indicated by reference 10, which includes an objective optical system 12, an erecting optical system composed of a roof mirror 13 and a prism assembly 14, a field lens 15, and an ocular optical system 16.

The objective optical system 12 has a positive objective lens 12A, a negative lens 12B positioned beside the positive lens 12A at the rear side thereof, and a positive lens 12C spaced to the rear of the negative lens 12B. An optical axis of the objective optical system 12 is perpendicularly deflected by the roof mirror 13. Namely, when light rays carrying a finder-image pass through the objective optical system 12, and become incident on the roof mirror 13, the light rays carrying the finder-image, as is well known, are reflected twice by the roof mirror 13, thereby being directed to the field lens 15.

The objective optical system 12 per se serves as a positive objective optical system, and defines an image-forming plane, indicated by reference A, on which the finder-image is focused and formed. The field lens 15 is positioned in the vicinity of the image-forming plane A.

Although the finder-image is obtained as an inverted image by the positive objective lens system 12, the finder-image is focused and formed as an erected image on the image-forming plane A, due to the existence of the roof mirror 13 operating in conjunction with the prism assembly 14 to create the erecting optical system (13, 14).

The prism assembly 14 comprises a pentagonal prism element 14A, which has a light-entrance surface $14A_1$, a light-emitting surface $14A_2$, a first reflective surface $14A_3$ and a second reflective surface $14A_4$. The light-entrance surface $14A_1$ and the light-emitting surface $14A_2$ are perpendicular to each other, and the first and second reflective surfaces $14A_3$ and $14A_4$ define an angle of 45° with respect to each other. Also, the ocular optical system 16 comprises an eyepiece 16A and an associated protective glass plate element 16B. The glass plate element 16B is assembled in an opening formed in a camera body, thereby defining a window for the viewfinder. As is apparent from FIGS. 1 and 2, the light-entrance surface $14A_1$ faces the field lens 15, and the light-emitting surface $14A_2$ faces the eyepiece 16A of the ocular optical system 16.

With this arrangement, the light rays carrying the finder-image, which are incident on the light-entrance surface $14A_1$, are reflected by the first reflective surface $14A_3$; are then reflected by the second reflective surface $14A_4$; and are thus emitted from the light-emitting surface $14A_2$, whereby the light rays carrying the finder-image are directed to the ocular optical system 16. Namely, when viewing through the ocular optical system 16, the finder-image can be observed as the erected image.

In the first embodiment as shown in FIGS. 1 and 2, the prism assembly 14 also includes a first additional prism element 14B attached to the second reflective surface $14A_4$ of the pentagonal prism element 14A, and a boundary surface therebetween is previously treated so as to exhibit a given reflective property or both transmittivity and reflectivity. Namely, the second reflective surface $14A_4$ serves as a half mirror. Thus, when the light rays become incident on the second reflective surface $14A_4$, a part of the incident light rays is reflected by the second reflective surface $14A_4$, and the remaining part of the incident light rays passes through the second reflective surface $14A_4$.

As shown in FIG. 1, the first additional prism element 14B has a light-entrance surface $14B_1$ and a light-emitting surface $14B_2$. The light-entrance surface $14B_1$ is in parallel with the light-emitting surface $14A_2$ of the pentagonal prism element 14A, and the light emitting surface $14B_2$ is coplanar with the light-entrance surface $14A_2$ of the pentagonal prism element 14A.

The light-entrance surface $14B_1$ of the first additional prism element 14B is associated with an optical information-pattern-forming system 18, which includes an LCD (Liquid Crystal Display) panel 18A and two polarizing plates 18B and 18C positioned at opposite sides of the LCD panel 18A. Note, the optical information-pattern forming system 18 is omitted from FIG. 2 for the purpose of simplifying the illustration.

The LCD panel 18A serves to produce information patterns, such as a viewing-field-frame for defining a frame area to be photographed, a photometry-sensing-frame for defining a photometric area to be measured, suitable information symbols and so on, to be displayed on a viewing field of the viewfinder. The information patterns are defined as light-transmitting-area segments produced on the LCD panel 18A. The polarizing plate 18B is assembled in an opening formed in the camera body, thereby defining a window for introducing natural or external light into the optical information-pattern-forming system 18. Note, in this first embodiment, the light-introduction window is preferably provided at a front side of the camera body.

In the optical information-pattern-forming system 18, the LCD panel 18A is positioned at a location that is the optical equivalent of the location of the image-forming plane A, defined by the objective optical system 12, with respect to the ocular optical system 16, and the optical information-pattern-forming system 18 is arranged such that a center of the LCD panel 18A is coaxial with an optical axis of the ocular optical system 16. Accordingly, the information patterns, produced by the LCD panel 18A, can be viewed through the ocular optical system 16. Namely, the finder-image, obtained by the objective optical system 12, and the information patterns, indicated by the LCD panel 18A, can be viewed through the ocular optical system 16, in such a manner that the information patterns are superimposed on the finder-image.

As mentioned above, the information patterns are defined as the light-transmitting-area segments produced on the LCD panel 18A. Accordingly, although particulate matter may be adhered to the opaque display area of the LCD panel 18A (excluding the light-transmitting-area segments forming the information patterns), the particulate matter cannot be viewed through the ocular optical system 16.

Optionally, the viewing-field-frame pattern of the information patterns, having a relatively large size, may be produced by a mask element 19 positioned in the vicinity of the image-forming plane A, as shown in FIG. 1. The mask element 19 may be manufactured from a suitable opaque plate or translucent plate, such as a frosted glass plate, and the viewing-field-frame is defined as an open area formed in the opaque plate or translucent plate. Of course, in this case, the particulate matter cannot adhere to the open area of the mask element 19. Also, when the mask element 19 is used to produce the viewing-field-frame, the size of the LCD panel 18A can be reduced, because the large viewing-field-frame is now omitted from the information patterns to be produced by the LCD panel 18A.

It is preferable to use the LCD panel 18A in the optical information-pattern-forming system 18, because the information patterns to be produced by the LCD panel 18A are variable and selectable. Nevertheless, for the purpose of producing the information patterns, a mask element may be substituted for the LCD panel 18A. In this case, similar to the above-mentioned mask element, the mask element concerned is made from a suitable opaque plate or translucent plate, such as a frosted glass plate, and the information patterns are defined as the open or transparent areas formed in the opaque plate or translucent plate.

In the first embodiment, as shown in FIGS. 1 and 2, the prism assembly 14 further includes a second additional prism element 14C attached to the light-emitting surface $14B_2$ of the first additional prism element 14B. In particular, the second additional prism element 14C has a light-entrance surface $14C_1$, and the attachment of the second additional prism element 14C to the first additional prism element 14B is carried out in such a manner that the light-entrance surface $14C_1$ of the second additional prism element 14C is in contact with the light-emitting surface $14B_2$ of the first additional prism element 14B.

The second additional prism element 14C has a spherical convex surface $14C_2$ formed thereon, to serve as a light-emitting surface. The optical axis of the objective optical system 12, which is deflected by the first reflective surface $14A_3$ and passes through the second reflective surface $14A_4$, defines a normal to the spherical convex surface $14C_2$ of the second additional prism element 14C, and a center of curvature of the spherical convex surface $14C_2$ is positioned on the deflected optical axis of the objective optical system 12.

The second additional prism element 14C is associated with a photometry optical system 20, which includes a converging lens 20A, and a photometry sensor 20B positioned at a focal point of the converging lens 20A. As shown in FIG. 1, the optical photometry system 20 faces the spherical convex surface or light-emitting surface $14C_2$ of the second additional prism element 14C, in such a manner that an optical axis of the photometry optical system 20 is coaxial with the optical axis of the objective optical system 12, deflected by the first reflective surface $14A_3$ and passing through the second reflective surface $14A_4$. Note, the photometry optical system 20 is also omitted from FIG. 2 for the purpose of simplifying the illustration.

The light rays, transmitted through the second reflective surface $14A_4$, are emitted from the spherical convex surface $14C_2$ of the second additional prism element 14C, via the light-emitting surface $14B_2$ of the first additional prism element 14B and the light-entrance surface $14C_1$ of the second additional prism element 14C. The light rays, emitted from the spherical convex surface $14C_2$, converge due to the converging lens 20A, and are then received by the photometry sensor 20B. Namely, the light rays carrying the finder-image, which are obtained through the objective optical system 12, are partially directed to the optical photometry system 20 for performing photometry.

In this first embodiment as mentioned above, the window for introducing natural or external light into the optical information-pattern-forming system 18 must be additionally provided in the camera body, but a window for introducing external light into the photometry optical system 20 is unnecessary, because a part of the light rays carrying the finder-image is directed to the photometry optical system 20, as mentioned above. Accordingly, a number of windows to be provided in the camera body is not increased with regards to a prior design.

Figure 3:
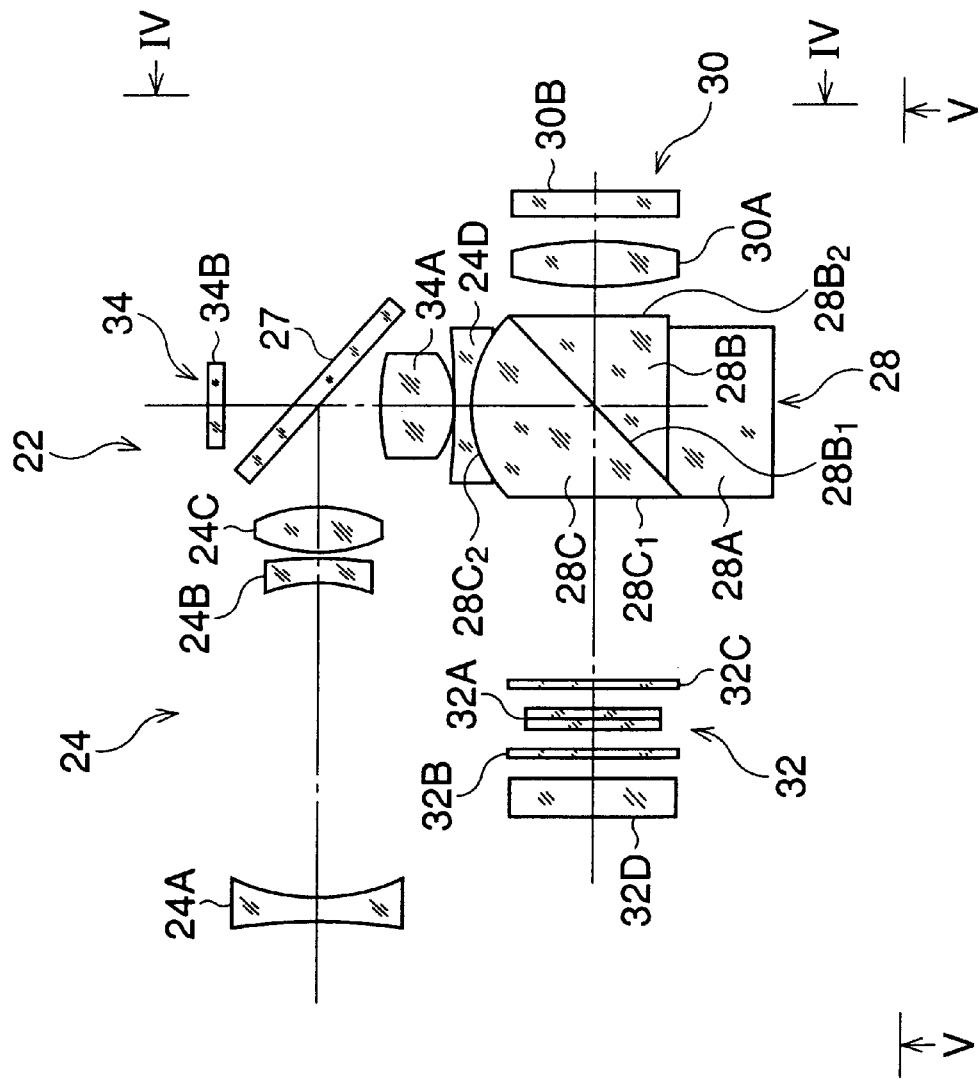
FIG. 3 is a plan view showing an arrangement of a viewfinder optical system of a second embodiment of a real-image type viewfinder according to the present invention.
Figure 4:
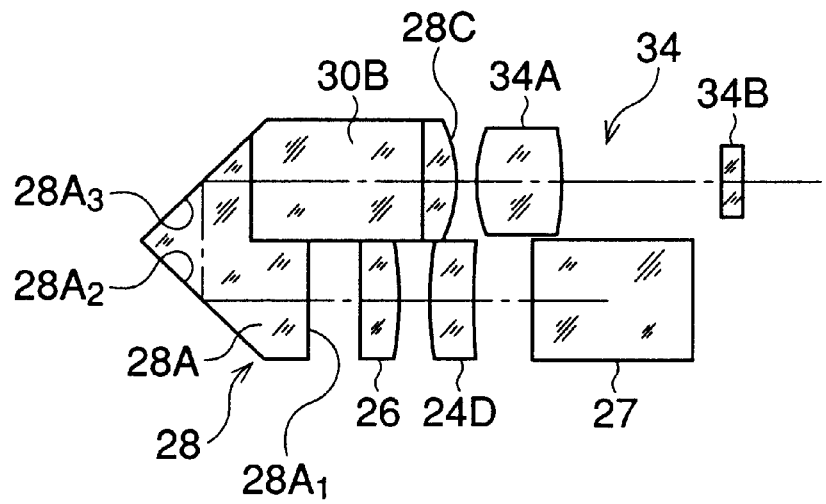
FIG. 4 is a side view of FIG. 3, observed from line IV—IV of FIG. 3.
Figure 5:
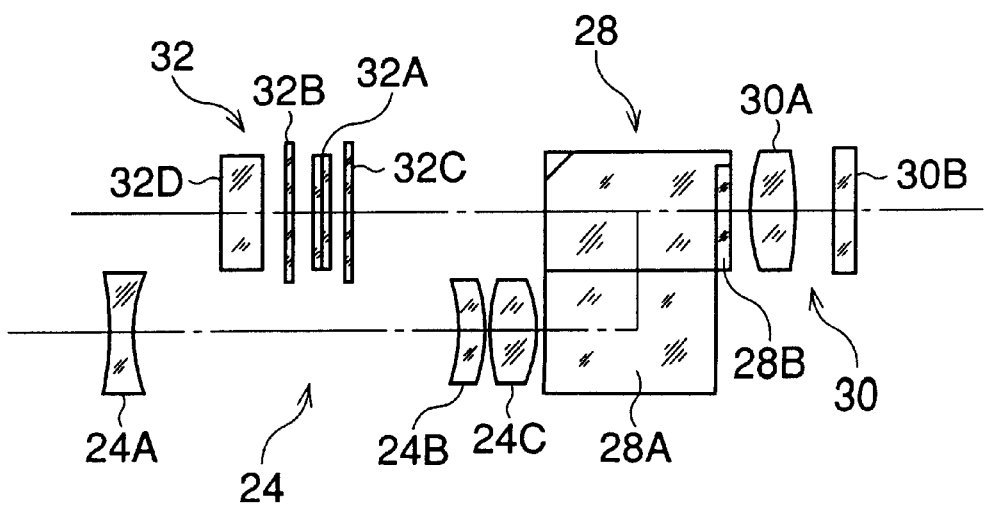
FIG. 5 is a side view of FIG. 3, observed from line V—V of FIG. 3.

FIGS. 3, 4 and 5 show a second embodiment of a real-image type viewfinder according to the present invention. The real-image type viewfinder comprises a viewfinder optical system, generally indicated by reference 22, which includes an objective optical system 24, a field lens 26 (FIG. 4), an erecting optical system composed of a reflective mirror 27 and a prism assembly 28, and an ocular optical system 30.

The objective optical system 24 has a negative objective lens 24A, a negative lens 24B spaced to the rear of the negative objective lens 24A, and a positive lens 24C positioned adjacent to a rear-side of the negative lens 24B. The reflective mirror 27, forming a part of the erecting optical system, is spaced to the rear of the positive lens 24C to perpendicularly bend an optical axis of the objective optical system 24. The objective optical system 24 also has a positive lens 24D arranged subsequent to and coaxial with the optical axis bent by the reflective mirror 27.

The objective optical system 24 per se serves as a positive objective optical system, and defines an image-forming plane. Accordingly, light rays carrying a finder-image, which pass through the objective optical system 24, are focused on the image-forming plane defined by the objective optical system 24, thus forming the finder-image on the image-forming plane. Similar to the field lens 15 of the first embodiment, the field lens 26 (FIG. 4) is positioned in the vicinity of the image-forming plane.

The prism assembly 28, operating in conjunction with the reflective mirror 27 to create the erecting optical system, includes a first prism element 28A and a second prim element 28B, each of which is shaped as a right-angled triangular prism. As shown in FIG. 4, the first prism element 28A has a light-entrance surface $28A_1$, perpendicular to the bent optical axis of the objective optical system 24, a first reflective surface $28A_2$, defining an angle of 45° with respect to the light-entrance surface 28A$_1$, and a second reflective surface 28A$_3$, defining an angle of 90° with respect to the first reflective surface 28A$_2$. As shown in FIG. 3, the second prism element 28B has a reflective surface 28B$_1$, defining an angle of 45° with respect to the light-entrance surface 28A of the first prism element 28A, and a light-emitting surface 28B$_2$, defining an angle of 45° with respect to the reflective surface 28B$_1$.

As best shown in FIG. 3, a surface of the first prism element 28A, which is in parallel with the light-entrance surface 28A$_1$, is in contact with a surface of the second prism element 28B, defining an angle of 45° with respect to the reflective surface 28B$_1$ and an angle of 90° with respect to the light-emitting surface 28B$_2$.

The ocular optical system 30 comprises an eyepiece 30A and an associated protective glass plate element 30B. Similar to the case of the first embodiment, the glass plate element 30B is assembled in an opening formed in a camera body, thereby defining a window for the viewfinder. As is apparent from FIGS. 3 and 4, the light-entrance surface 28A$_1$ of the first prism element 28A faces the field lens 26, and the light-emitting surface 28B$_2$ of the second prism element 28B faces the eyepiece 30A of the ocular optical system 30.

With this arrangement, the light rays carrying the finder-image, which are incident on the light-entrance surface 28A$_1$ of the first prism element 28A, are reflected by the first reflective surface 28A$_2$, are then reflected by the second reflective surface 28A$_3$, are further reflected by the reflective surface 28B$_1$ of the second prism element 28B, and are thus emitted from the light-emitting surface 28B$_2$, whereby the light rays carrying the finder-image are directed to the ocular optical system 30. Although the finder-image is obtained as an inverted image by the positive objective lens system 24, the finder-image can be viewed as an erected image through the ocular optical system 30, due to the existence of the erecting optical system (27, 28).

In the second embodiment, as shown in FIGS. 3 to 5, an additional prism element 28C is attached to the reflective surface 28B$_1$ of the second prism element 28B, and a boundary surface therebetween is previously treated so as to exhibit a given reflective property or both transmittivity and reflectivity. Namely, the reflective surface 28B$_1$ of the second prism element 28B serves as a half mirror. Thus, when the light rays are incident on the reflective surface 28B$_1$, a part of the incident light rays is reflected by the reflective surface 28B$_1$, and the remaining part of the incident light rays passes through the reflective surface 28B$_1$.

As best shown in FIG. 3, the additional prism element 28C has a light-entrance surface 28C$_1$ and a spherical convex surface which serves as a light-emitting surface 28C$_2$. The light-entrance surface 28C$_1$ is arranged in parallel to the light-emitting surface 28B$_2$ of the second prism element 28B. The optical axis of the objective optical system 24, which is deflected by the second reflective surface 28A$_3$ and passes through the reflective surface 28B$_1$ (half mirror), defines a normal to the spherical convex light-emitting surface 28C$_2$ of the additional prism element 28C, and a center of curvature of the spherical convex surface 28C$_2$ is positioned on the deflected optical axis of the objective optical system 24.

The light-entrance surface 28C$_1$ of the additional prism element 28C is associated with an optical information-pattern-forming system 32 including an LCD (Liquid Crystal Display) panel 32A, two polarizing plates 32B and 32C positioned at opposite sides of the LCD panel 32A, and an optical diffusion late 32D, such as a frosted glass plate, positioned at a front side of the polarizing plate 32B.

Similar to the case of the first embodiment, the LCD panel 32A serves to produce information patterns, such as a viewing-field-frame for defining a frame area to be photographed, a photometry-sensing-frame for defining a photometric area to be measured, suitable information symbols and so on, to be displayed on a viewing field of the viewfinder. The information patterns are defined as light-transmitting-area segments produced on the LCD panel 32A. The optical diffusion plate 32D is assembled in an opening formed in the camera body, thereby defining a window for introducing natural or external light into the optical information-pattern-forming system 32. Note, in this second embodiment, the light-introduction window is preferably provided at the front side of the camera body.

Similar to the case of the first embodiment, the LCD panel 32A is positioned at a location that is the optical equivalent of the location of the image-forming plane with respect to the ocular optical system 30, and the optical information-pattern-forming system 32 is arranged such that a center of the LCD panel 32A is coaxial with an optical axis of the ocular optical system 30. Accordingly, the information patterns, produced by the LCD panel 32A, can be viewed through the ocular optical system 30. Namely, the finder-image, obtained by the objective optical system 24, and the information patterns, indicated by the LCD panel 32A, can be viewed through the ocular optical system 30 in such a manner that the information patterns are superimposed on the finder-image.

Also, similar to the first embodiment, the information patterns are defined as the light-transmitting-area segments produced on the LCD panel 32A. Accordingly, although particulate matter may be adhered to the opaque display area of the LCD panel 32A (excluding the light-transmitting-area segments forming the information patterns), the particulate matter cannot be viewed through the ocular optical system 30.

Further, similar to the case of the first embodiment, the viewing-field-frame, having the largest relative size of the information patterns to be displayed, may be defined by a mask element, positioned in the vicinity of the image-forming plane of the objective optical system 24, being manufactured from a suitable opaque plate or translucent plate, such as a frosted glass plate. Also, in the second embodiment, a mask element may be substituted for the LCD panel 32A, in a manner similar to the case of the first embodiment.

The spherical convex light-emitting surface 28C$_2$ of the additional prism element 28C is associated with a photometry optical system 34, which includes a converging lens 34A, and a photometry sensor 34B positioned at a focal point of the converging lens 34A. As shown in FIGS. 3 and 4, the converging lens 34A faces the spherical convex light-emitting surface 28C$_2$ of the additional prism element 28C, in such a manner that an optical axis of the photometry optical system 34 is coaxial with the optical axis of the objective optical system 24, which is deflected by the second reflective surface 28A$_3$ and passes through the reflective surface 28B$_1$ (half mirror).

The transmitted light rays are emitted from the spherical convex surface 28C$_2$ of the additional prism element 28C. The emitted light rays converge due to the converging lens 34A, and are then received by the photometry sensor 34B. Namely, the light rays carrying the finder-image, which are obtained through the objective optical system 24, are partially directed to the optical photometry system 34 for performing photometry.

In the second embodiment as mentioned previously, the window for introducing natural or external light into the optical information-pattern-forming system 32 must be additionally provided in the camera body, but a window for introducing external light into the optical photometry system 34 is unnecessary, because a part of the light rays carrying the finder-image is directed to the optical photometry system 34, as mentioned above. Accordingly, similar to the case of the first embodiment, a number of windows to be provided in the camera body is not increased with respect to a prior design.

Figure 6:
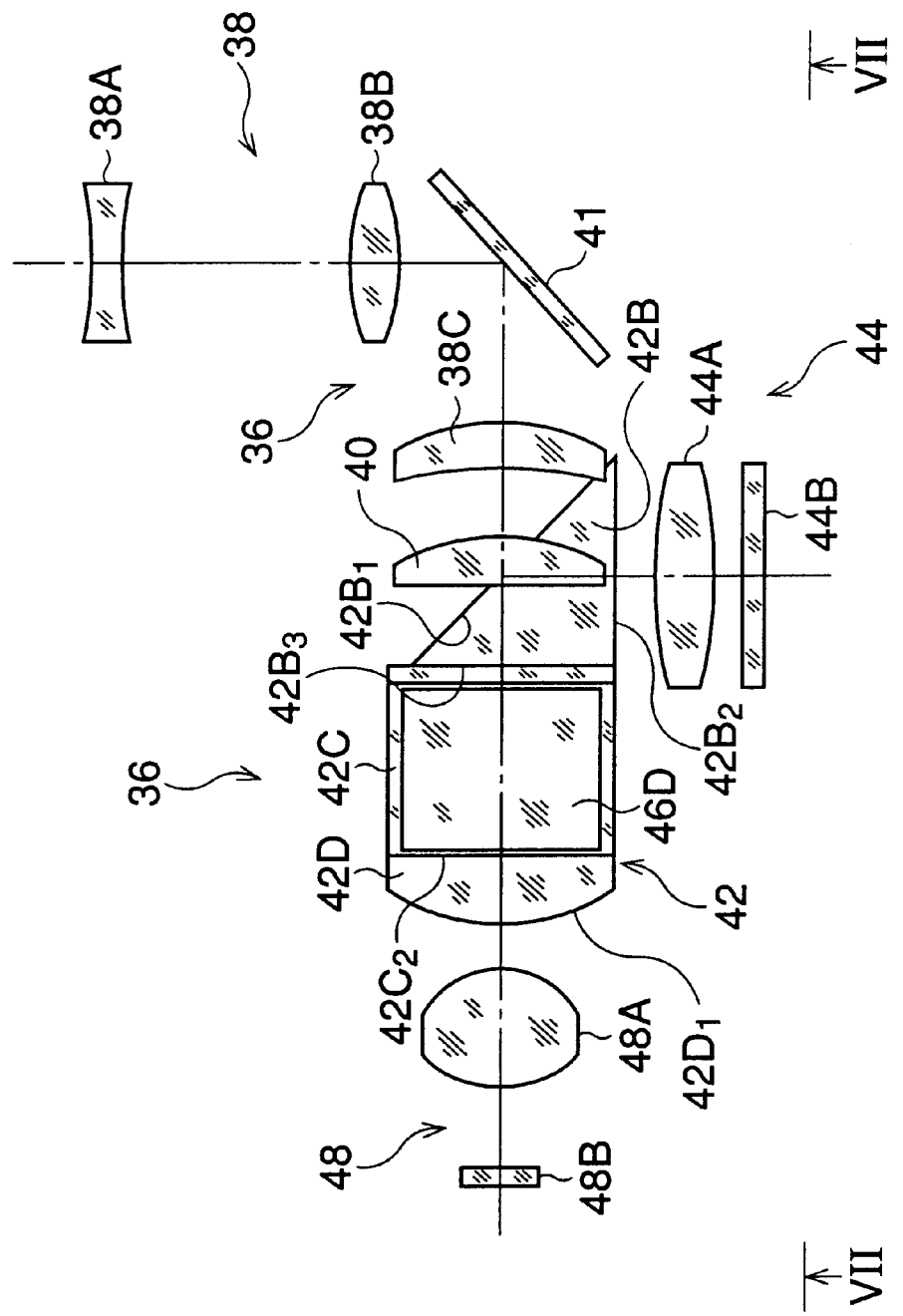
FIG. 6 is a plan view showing an arrangement of a viewfinder optical system of a third embodiment of a real-image type viewfinder according to the present invention.
Figure 7:
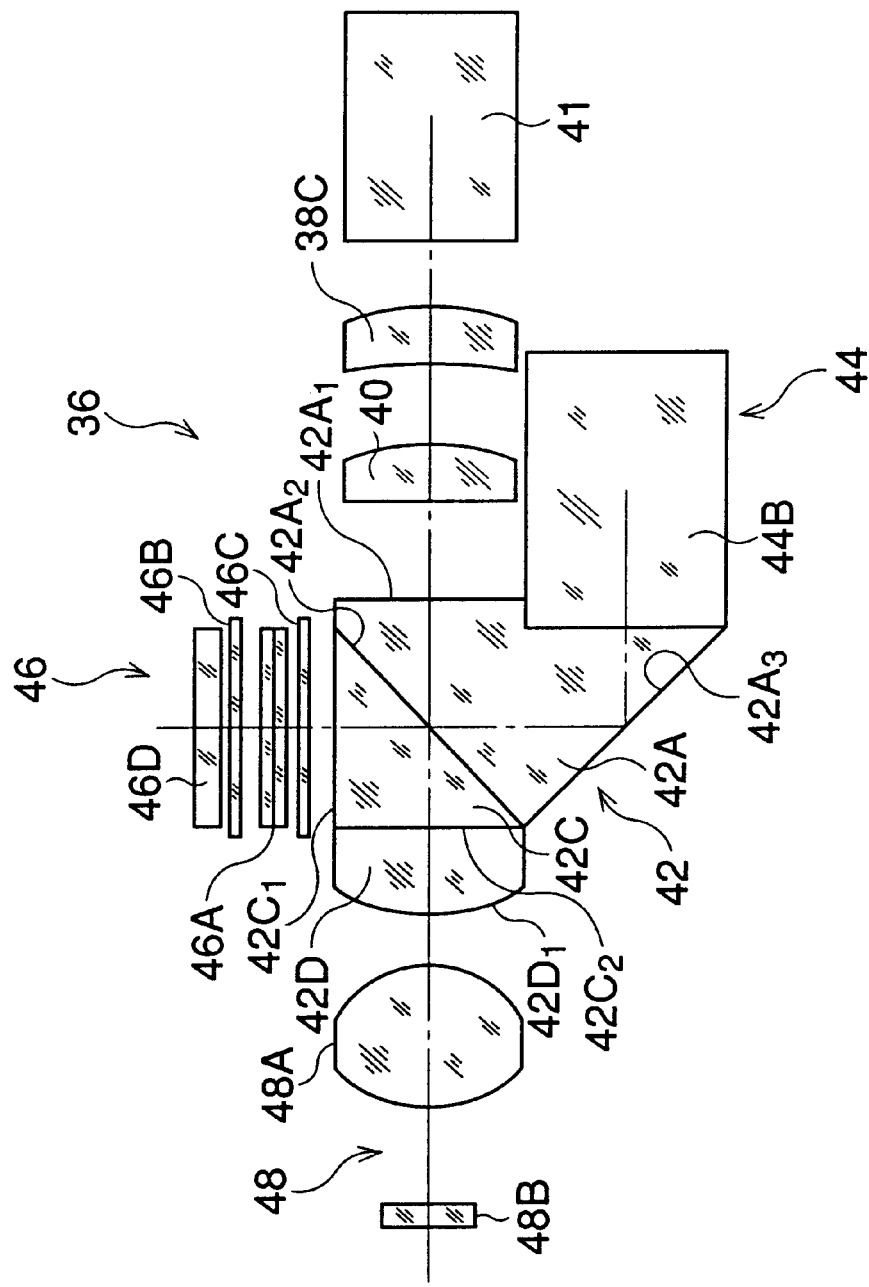
FIG. 7 is a side view of FIG. 6, observed from line VII—VII of FIG. 6.

FIGS. 6 and 7 show a third embodiment of a real-image type viewfinder, according to the present invention. The real-image type viewfinder comprises a viewfinder optical system, generally indicated by reference 36, which includes an objective optical system 38, a field lens 40, an erecting optical system composed of a reflective mirror 41 and a prism assembly 42, and an ocular optical system 44.

The objective optical system 38 has a negative objective lens 38A, and a positive lens 38B spaced to the rear of the negative objective lens 38A. The reflective mirror 41, forming a part of the erecting optical system, is spaced to the rear of the positive lens 38B to perpendicularly bend an optical axis of the objective optical system 38. The objective optical system 38 further has a positive lens 38C arranged subsequent to and coaxial with the optical axis bent by the reflective mirror 41.

The objective optical system 38 per se serves as a positive objective optical system, defining an image-forming plane. Accordingly, light rays carrying a finder-image, which pass through the objective optical system 38, are focused on the image-forming plane defined by the objective optical system 38, and thus the finder-image is formed on the image-forming plane. Similar to the field lens 13B of the first embodiment, the field lens 40 is positioned in the vicinity of the image-forming planes.

The prism assembly 42, operating in conjunction with the reflective mirror 41 to form the erecting optical system, includes a first prism element 42A and a second prim element 42B, each of which is shaped as a right-angled triangular prism. As shown in FIG. 7, the first prism element 42A has a light-entrance surface $42A_1$ perpendicularly arranged with respect to the bent optical axis of the objective optical system 38, a first reflective surface $42A_2$ defining an angle of 45° with respect to the light-entrance surface $42A_1$, and a second reflective surface $42A_3$ defining an angle of 90° with respect to the first reflective surface $42A_2$. As shown in FIG. 6, the second prism element 42B has a reflective surface $42B_1$ defining an angle of 45° with respect to the light-entrance surface $42A_1$ of the first prism element 42A, and a light-emitting surface $42B_2$ defining an angle of 45° with respect to the reflective surface $42B_1$.

As is apparent from FIGS. 6 and 7, a surface of the first prism element 42A is in contact with a surface of the second prism element 42B, defining an angle of 45° with respect to the reflective surface $42B_1$ and an angle of 90° with respect to the light-emitting surface $42B_2$.

The ocular optical system 44 comprises an eyepiece 44A and an associated protective glass plate element 44B. Similar to the cases of the first and second embodiments, the glass plate element 44B is assembled in an opening formed in a camera body, thereby defining a window for the viewfinder. As is apparent from FIGS. 6 and 7, the light-entrance surface 42Al of the first prism element 42A faces the field lens 40, and the light-emitting surface $42B_2$ of the second prism element 42B faces the eyepiece 44A of the ocular optical system 44.

With this arrangement, the light rays carrying the finder-image, which are incident on the light-entrance surface $42A_1$ of the first prism element 42A, are reflected by the first reflective surface $42A_2$, are then reflected by the second reflective surface $42A_3$, are further reflected by the reflective surface $42B_1$ of the second prism element 42B, and are thus emitted from the light-emitting surface $42B_2$, whereby the light rays carrying the finder-image are directed to the ocular optical system 44. Although the finder-image is obtained as an inverted image by the positive objective lens system 38, the finder-image can be viewed as an erected image through the ocular optical system 44, due to the existence of the erecting optical system (41, 42).

In the third embodiment as shown in FIGS. 6 and 7, an additional triangular prism element 42C is attached to the first reflective surface $42A_2$ of the first prism element 42A, and a boundary surface therebetween is previously treated so as to exhibit a given reflective property or both transmittivity and reflectivity. Namely, the reflective surface $42A_2$ of the first prism element 42A serves as a half mirror. Thus, when the light rays are incident on the reflective surface $42A_2$, a part of the incident light rays is reflected by the first reflective surface $42A_2$, and the remaining part of the incident light rays passes through the reflective surface $42A_2$.

As best shown in FIG. 7, the additional triangular prism element 42C has a light-entrance surface $42C_1$ and a light-emitting surface $42C_2$. The light-entrance surface $42C_1$ is perpendicularly arranged with respect to an optical axis of the light rays, incident on and transmitted by the reflective surface $42A_2$ of the first prism element 42A. The light-emitting surface $42C_2$ is arranged in parallel with the light-entrance surface $42A_1$ of the first prism element 42A.

The light-entrance surface $42C_1$ of the additional triangular prism element 42C is associated with an optical information-pattern-forming system 46 including an LCD (Liquid Crystal Display) panel 46A, two polarizing plates 46B and 46C positioned on opposite sides of the LCD panel 46A, and an optical diffusion plate 46D, such as a frosted glass plate, positioned at a front side of the polarizing plate 46B.

Similar to the cases of the first and second embodiments, the LCD panel 46A serves to produce information patterns, such as a viewing-field-frame for defining a frame area to be photographed, a photometry-sensing-frame for defining a photometric area to be measured, suitable information symbols and so on, to be displayed on a viewing field of the viewfinder. The information patterns are defined as light-transmitting-area segments produced on the LCD panel 46A. The optical diffusion plate 46D is assembled in an opening formed in the camera body, thereby defining a window for introducing natural or external light into the optical information-pattern-forming system 46. Note, in this third embodiment, the light-introduction window is preferably provided at a top side of the camera body.

Also, similar to the cases of the first and second embodiments, the LCD panel 46A is positioned at a location that is the optical equivalent of the location of the image-forming plane with respect to the ocular optical system 44, and the optical information-pattern-forming system 46 is arranged such that a center of the LCD panel 46A is coaxial with an optical axis of the ocular optical system 44. Accordingly, the information patterns, produced by the LCD panel 46A, can be viewed through the ocular optical system 44. Namely, the finder-image, obtained by the objective optical system 38, and the information patterns, indicated by the LCD panel 46A, can be viewed through the ocular optical system 44 in such a manner that the information patterns are superimposed on the finder-image.

Further, similar to the cases of the first and second embodiments, the information patterns are defined as the light-transmitting-area segments produced on the LCD panel 46A. Accordingly, although particulate matter may be adhered to the opaque display area of the LCD panel 46A (excluding the light-transmitting-area segments forming the information patterns), the particulate matter cannot be viewed through the ocular optical system 44.

Furthermore, similar to the cases of the first and second embodiments, the viewing-field-frame, having the largest relative size of the information patterns to be displayed, may be defined by a mask element, positioned in the vicinity of the image-forming plane of the objective optical system 38, being manufactured from a suitable opaque plate or translucent plate, such as a frosted glass plate. Also, in the second embodiment, a mask element may be substituted for the LCD panel 46A, in a manner similar to the case of the first embodiment.

In the third embodiment as shown in FIGS. 6 and 7, a positive lens element 42D is attached to the light-emitting surface $42C_2$ of the additional triangular prism element 42C, and has a spherical convex surface $42D_1$ which serves as a light-emitting surface formed thereon. The positive lens element 42D has an optical axis which is coaxial with an optical axis of the objective optical system, which is deflected by the reflective mirror 41 and passes through the reflective surface $42A_2$ (half mirror) of the first prism element 42A and the light-emitting surface $42C_2$ of the additional triangular prism element 42C.

The spherical convex light-emitting surface $42D_1$ of the positive lens element 42D is associated with a photometry optical system 48, which includes a converging lens 48A, and a photometry sensor 48B positioned at a focal point of the converging lens 48A. As shown in FIGS. 6 and 7, the converging lens 48A faces the spherical convex surface light-emitting surface $42D_1$ of the positive lens element 42D, in such a manner that an optical axis of the photometry optical system 48 is coaxial with the optical axis of the positive lens element 42D.

The light rays, emitted from the spherical convex surface $42D_1$ of the positive lens element 42D, converge due to the converging lens 48A, and are then received by the photometry sensor 48B. Namely, the light rays carrying the finder-image, which are obtained through the objective optical system 38, are partially directed to the optical photometry system 48 for performing photometry.

In the third embodiment as mentioned above, the window for introducing natural or external light into the optical information-pattern-forming system 46 must be additionally provided in the camera body, but a window for introducing external light into the optical photometry system 48 is unnecessary, because a part of the light rays carrying the finder-image is directed to the optical photometry system 48, as mentioned above. Accordingly, similar to the cases of the first and second embodiments, a number of windows to be provided in the camera body is not increased with respect to a prior design.

As is apparent from the foregoing, in order to superimpose the information patterns on the finder-image, a reflective surface ($14A_4$; $28B_1$; $42A_2$) of the prism (14A; 28B; 42A), which forms a part of the erecting optical system, is utilized as a half mirror. Accordingly, when the present invention is applied to an existing camera, it is unnecessary to modify a basic design for a viewfinder optical system of the existing camera, i.e. a basic arrangement including a positive objective optical system (12; 24; 38), an erecting optical system (13, 14; 27, 28; 41, 42) and an ocular lens system (16; 30; 44).

Finally, it will be understood by those skilled in the art that the foregoing description is of preferred embodiments of the device, and that various changes and modifications may be made to the present invention without departing from the spirit and scope thereof.

The present disclosure relates to subject matter contained in Japanese Patent Application No. 9-067234 (filed on Mar. 5, 1997) which is expressly incorporated herein, by reference, in its entirety.

I claim:

1. A real-image type viewfinder comprising a viewfinder optical system which includes:

a positive objective optical system that obtains an inverted finder-image;

an erecting optical system, including an optical prism assembly, that converts the inverted finder-image into an erected finder-image;

an ocular optical system that views the erected finder-image;

a half mirror element provided at a suitable location along a viewfinder optical axis defined by said viewfinder optical system, said half mirror element being formed with a surface of said optical prism assembly;

a photometry optical system provided such that an optical axis of said photometry optical system is coaxial with an extension of an optical axis of said positive objective optical system, passing through said half mirror element; and an optical information-pattern-forming system provided along an extension of an optical axis of said ocular optical system, passing through said half mirror element.

2. A real-image type viewfinder as set forth in claim 1, wherein said optical prism assembly comprises a pentagonal prism associated with a roof mirror.

3. A real-image type viewfinder as set forth in claim 1, wherein said optical prism assembly comprises at least two right-angled triangular prisms associated with a reflective mirror.

4. A real-image type viewfinder as set forth in claim 1, wherein said optical information-pattern-forming system comprises a liquid crystal display panel in which information patterns are produced as light-transmitting-area segments.

5. A real-image type viewfinder as set forth in claim 1, wherein said optical information-pattern-forming system comprises a mask element in which information patterns are formed as light-transmitting-area segments.

6. A real-image type viewfinder as set forth in claim 1, wherein said viewfinder optical system further includes a mask element positioned adjacent to an image-forming plane defined by said positive objective optical system, and a viewing-field-frame pattern of said information patterns is defined as an open area formed in said mask element.

7. A real-image type viewfinder comprising a viewfinder optical system which includes:

a positive objective optical system that obtains an inverted finder-image;

an erecting optical system that converts the inverted finder-image into an erected finder-image;

an ocular optical system that views the erected finder-image;

a half mirror element provided at a suitable location along a viewfinder optical axis defined by said viewfinder optical system;

a photometry optical system provided such that an optical axis of said photometry optical system is coaxial with an extension of an optical axis of said positive objective optical system, passing through said half mirror element; and an optical information-pattern-forming system provided along an extension of an optical axis of said ocular optical system, passing through said half mirror element, said optical information-pattern-forming system being arranged at a front side of a camera body so as to be illuminated with natural or external light.

8. A real-image type viewfinder comprising a viewfinder optical system which includes:

a positive objective optical system that obtains an inverted finder-image;

an erecting optical system that converts the inverted finder-image into an erected finder-image;

an ocular optical system that views the erected finder-image;

a half mirror element provided at a suitable location along a viewfinder optical axis defined by said viewfinder optical system;

a photometry optical system provided such that an optical axis of said photometry optical system is coaxial with an extension of an optical axis of said positive objective optical system, passing through said half mirror element; and an optical information-pattern-forming system provided along an extension of an optical axis of said ocular optical system, passing through said half mirror element, said optical information-pattern-forming system being arranged at a top side of a camera body so as to be illuminated with natural or external light.

9. A real-image type viewfinder comprising a viewfinder optical system which includes:

positive objective optical means for obtaining an inverted finder-image;

erecting optical means for converting the inverted finder-image into an erected finder-image, said erecting optical means including an optical prism assembly;

ocular optical means for viewing the erected finder-image;

half mirror means provided at a suitable location along a viewfinder optical axis defined by said viewfinder optical system, said half mirror means being formed with a surface of said optical prism assembly;

photometry optical means provided such that an optical axis of said photometry optical means is coaxial with an extension of an optical axis of said positive objective optical means, passing through said half mirror means; and optical information-pattern-forming means provided along an extension of an optical axis of said ocular optical means, passing through said half mirror means.

10. A real-image type viewfinder as set forth in claim 9, wherein said optical prism assembly comprises a pentagonal prism associated with a roof mirror.

11. A real-image type viewfinder as set forth in claim 9, wherein said optical prism assembly comprises at least two right-angled triangular prisms associated with a reflective mirror.

12. A real-image type viewfinder as set forth in claim 9, wherein said optical information-pattern-forming means comprises a liquid crystal display panel in which information patterns are produced as light-transmitting-area segments.

13. A real-image type viewfinder as set forth in claim 9, wherein said optical information-pattern-forming means comprises a mask element in which information patterns are formed as light-transmitting-area segments.

14. A real-image type viewfinder as set forth in claim 9, wherein said viewfinder optical system further includes a mask element positioned adjacent to an image-forming plane defined by said positive objective optical means, and a viewing-field-frame pattern of said information patterns is defined as an open area formed in said mask element.

15. A real-image type viewfinder comprising a viewfinder optical system which includes:

positive objective optical means for obtaining an inverted finder-image;

erecting optical means for converting the inverted finder-image into an erected finder-image;

ocular optical means for viewing the erected finder-image;

half mirror means provided at a suitable location along a viewfinder optical axis defined by said viewfinder optical system;

photometry optical means provided such that an optical axis of said photometry optical means is coaxial with an extension of an optical axis of said positive objective optical means, passing through said half mirror means; and optical information-pattern-forming means provided along an extension of an optical axis of said ocular optical means, passing through said half mirror means, said optical information-pattern-forming means being arranged at a front side of a camera body so as to be illuminated with natural or external light.

16. A real-image type viewfinder comprising a viewfinder optical system which includes:

positive objective optical means for obtaining an inverted finder-image;

erecting optical means for converting the inverted finder-image into an erected finder-image;

ocular optical means for viewing the erected finder-image;

half mirror means provided at a suitable location along a viewfinder optical axis defined by said viewfinder optical system;

photometry optical means provided such that an optical axis of said photometry optical means is coaxial with an extension of an optical axis of said positive objective optical means, passing through said half mirror means; and optical information-pattern-forming means provided along an extension of an optical axis of said ocular optical means, passing through said half mirror means, said optical information-pattern-forming means being arranged at a top side of a camera body so as to be illuminated with natural or external light.

* * * * *